United States Patent [19]

Inaba et al.

[11] Patent Number: 4,959,200

[45] Date of Patent: Sep. 25, 1990

[54] PROCESS FOR MANUFACTURING SILANE

[75] Inventors: Shin-ichi Inaba; Hideki Nagahama, both of Minamata, Japan

[73] Assignee: Chisso Corporation, Japan

[21] Appl. No.: 152,306

[22] Filed: Feb. 4, 1988

[30] Foreign Application Priority Data

Feb. 10, 1987 [JP] Japan ................................. 62-28768

[51] Int. Cl.$^5$ ............................................ C01B 33/04
[52] U.S. Cl. ..................................................... 423/347
[58] Field of Search .......................................... 423/347

[56] References Cited

U.S. PATENT DOCUMENTS 4,016,188  4/1977  Kotzsch et al. ...................... 423/347

FOREIGN PATENT DOCUMENTS 1270207  11/1986  Japan .................................. 423/347
327781  12/1976  U.S.S.R. ............................. 423/347

OTHER PUBLICATIONS

Condensed Chemical Dictionary 10th Edition Hawley, 1981 p. 141.
Hackh's Chemical Dictionary, 4th Edition Grant ed. p. 708.

Primary Examiner—John Doll
Assistant Examiner—Lori F. Cuomo
Attorney, Agent, or Firm—Leydig, Voit & Mayer

[57] ABSTRACT

There is here provided a method for manufacturing silane by subjecting a raw material, trialkoxysilane, to a disproportionation reaction in the gaseous phase in the presence of a catalyst which is an oxide of a metal in the third period of the periodic table. According to the present invention, silane can be obtained effectively without any by-products, and the reaction can be easily controlled and stopped promptly in an emergency.

17 Claims, No Drawings

PROCESS FOR MANUFACTURING SILANE

BACKGROUND OF THE INVENTION

1. Field of the Invention

The present invention relates to a process for manufacturing silane, and more particularly it relates to an improved process for manufacturing silane by a disproportionation reaction of a trialkoxysilane.

2. Description of the Prior Art

Silane is useful as a raw material of grown epitaxial silicon film, amorphous silicon for solar cells and light-sensitive drums of electronic duplicating machines, and polycrystalline silicon for semiconductors.

Heretofore, silane has been manufactured by the following known methods: (1) A method of reacting magnesium silicide with an ammonium salt in liquid ammonia (e.g., Japanese Patent Publication No. 38-19951); (2) a method of reducing chlorosilane with a metallic hydride such as lithium hydride (e.g., Japanese Patent Publication Nos. 39-3660 and 59-1211); (3) a method of disproportioning chlorosilane in the presence of a catalyst such as a compound containing an α-oxo-amine group (e.g., Japanese Patent Laid-open Application No. 59-54617); or (4) a method of disproportioning a trialkoxysilane in a liquid phase in the presence of a catalyst such as sodium ethoxide, magnesium acetylacetonate, lithium chloride or hexamethylphosphoric triamide (e.g., Japanese Patent Publication Nos. 51-20440 and 60-4195).

Of these conventional manufacturing methods, the first method has drawbacks that an especial compound such as magnesium silicide must be employed, and that liquid ammonia is used and, therefore, facilities for maintaining high pressure and low temperature are necessary, which requires large investments. In addition, the first method involves the disposal of a sludge of magnesium salts containing ammonia.

In the second method mentioned above, a dangerous compound such as the metallic hydride which is to be handled with much attention must be employed, and in addition, by-products such as chlorine and lithium chloride are formed in quantities. In this case, in order to recover and reuse these by-products, a complex recycling system must be developed. Further, in common with the third method mentioned above, corrosive chlorosilane is employed as a starting material, and, therefore, there is the disadvantage that measures must be taken against the corrosion of the apparatus used.

The fourth method mentioned above is based on the fact that a trialkoxysilane can be disproportioned more easily than trichlorosilane and the fact that the disproportionation reaction makes progress even at room temperature in the presence of a suitable catalyst in order to obtain a disproportioned product such as silane. Thus, in the fourth method, the disproportionation reaction is performed under moderate heating conditions in a liquid phase reaction. This method seems to be ideal, but in fact it is not so. In the case that a dangerous compound such as silane is manufactured on an industrial scale, it is essential that the reaction can be easily controlled. However, this method does not satisfy such a requirement. That is, in the method of the disproportionation reaction of a trialkoxysilane by a liquid phase reaction, the prompt termination of the reaction cannot be made in the middle of the reaction, when needed. The reasons are that the catalyst is dissolved or suspended in the liquid reaction system, or the solid catalyst is always in contact with the material, and that the reaction heat is elevated, even if heating of the reactor is stopped and the system is cooled to room temperature. As understood from the foregoing, the fourth conventional method has the serious drawback that the reaction cannot be stopped promptly.

SUMMARY OF THE INVENTION

The present invention has been intended to solve the above-mentioned problems, and it is an object of the present invention to provide a process for manufacturing silane selectively and with a high yield by which the disproportionation reaction of a trialkoxysilane can be easily controlled.

According to the present invention, there is provided a process for manufacturing silane which is characterized by subjecting a trialkoxysilane represented by the general formula (A)

wherein each of $R^1$, $R^2$ and $R^3$ is an alkyl group having 1 to 3 carbon atoms, to a disproportionation reaction in the gaseous phase in the presence of a catalyst which is an oxide of a metal in the third period of the periodic table.

DESCRIPTION OF THE PREFERRED EMBODIMENTS

The inventors of the present application have researched the disproportionation reaction of alkoxysilane in detail, and they have found that the control of the reaction can be easily carried out by feeding an alkoxysilane, which has been previously rendered gaseous, to a solid catalyst, and that an oxide of a metal in the third period of the periodic table is effective as the solid catalyst, and the present invention has been completed on the basis of these findings.

The present invention is directed to a process for manufacturing silane which is characterized by subjecting a trialkoxysilane represented by the general formula (A)

wherein each of $R^1$, $R^2$ and $R^3$ is an alkyl group having 1 to 3 carbon atoms, to a disproportionation reaction in a gaseous phase in the presence of a catalyst which is an oxide of a metal in the third period of the periodic table.

The trialkoxysilane which is the raw material in the present invention may have one kind of alkoxy group, or two or more kinds of alkoxy group, and in the latter case, it is called the mixed trialkoxysilane. Examples of the usable trialkoxysilanes include trimethoxysilane, triethoxysilane, tripropoxysilane, triisopropoxysilane, ethoxydimethoxysilane, diethoxymethoxysilane, dimethoxypropoxysilane and diethoxyisopropoxysilane.

The catalyst used in the present invention is an oxide of a metal in the third period of the periodic table. Examples of the metallic oxides include magnesium oxide, aluminum oxide and silicon dioxide, and of these compounds, aluminum oxide is particularly preferable.

The reaction of the present invention proceeds in the gaseous phase. That is, a reaction tube filled with the catalyst is heated, and the vapor of the trialkoxysilane is fed to the heated reaction tube in order to perform the disproportionation reaction.

The trialkoxysilane may be vaporized, diluted with a gas such as helium, argon, nitrogen or hydrogen, or may not be diluted, and fed to the reaction tube. When the trialkoxysilane is previously heated by a preheater, it is easy to maintain reaction temperature at a constant level.

The reaction temperature is preferably within a range of 100° to 500° C., more preferably 150° to 350° C. When the reaction temperature is less than 100° C., conversion of the trialkoxysilane is too low; when it is more than 500° C., silane produced tends to decompose.

The reaction proceeds in accordance with the following reaction formula:

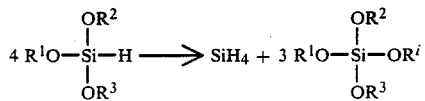

wherein $R^i$ is any one of $R^1$, $R^2$ or $R^3$ which is an alkyl group having 1 to 3 carbon atoms.

In the present invention, the oxide of the metal in the third period of the periodic table is selected as the catalyst, and therefore the trialkoxysilane in a gaseous state can be fed to the solid catalyst layer so as to permit the disproportionation reaction of the material, so that the reaction can be easily controlled by regulating the feed of the trialkoxysilane. In an extreme case, the termination of the material feed enables the reaction to be halted quickly. Since the catalyst has great effect and good selectivity, silane and a tetraalkoxysilane can be manufactured selectively, and the production of a dialkoxysilane and a monoalkoxysilane which are intermediate products can be inhibited. In consequence, it is easy to purify the desired product, and therefore the yield of the product is also high.

According to the present invention, silane which is a dangerous compound can be obtained under safe control without forming by-products other than the tetraalkoxy-silane, and so it is fair to say that the present invention is of the great practical value.

EXAMPLES

Now, the present invention will be described in detail in reference to examples, but it should not be limited to these examples.

EXAMPLE 1

A glass reaction tube was filled with 0.5 g of aluminum oxide and was then heated to 250° C. in an electric furnace. A mixture of vaporized trimethoxysilane (flow rate 2.4 ml/min.) and helium (flow rate 20 ml/min.) was heated to 250° C. by a preheater and was then fed to the reaction tube, where a disproportionation reaction was performed. The gaseous reaction mixture coming out of the reaction tube was analyzed by gas chromatography every 30 minutes. The composition proportions of unreacted trimethoxysilane, silane and tetramethoxysilane were substantially constant during the reaction.

Dimethoxysilane and monomethoxysilane were not detected during the reaction.

Nine hours after the beginning of the reaction, analysis was performed, and the results were as follows:
Conversion of trimethoxysilane: 63%
Yield of silane to fed trimethoxysilane: 63%
(yield of silane to converted trimethoxysilane: 100%)
Yield of tetramethoxysilane to fed trimethoxysilane: 63%
(yield of tetramethoxysilane to converted trimethoxysilane: 100%)
In addition, by-products were not detected.

EXAMPLES 2 and 3

The same gaseous phase reaction device as in Example 1 was used, and different kinds of trialkoxysilanes and metallic oxide catalysts were employed under the same reaction conditions as in Example 1 in order to perform a disproportionation reaction, thereby producing silane. The results are set forth in Table 1.

TABLE 1

| | Disproportionation of Trialkoxysilane | |
|---|---|---|
| | Example 2 | Example 3 |
| Trialkoxysilane | Triethoxysilane | Trimethoxysilane |
| Catalyst | Aluminum oxide | Silicon dioxide |
| Conversion of trialkoxysilane | 26% | 15% |
| Yield of silane to fed trialkoxysilane | 26% | 15% |

Similarly in these examples, any production of a dialkoxysilane and a monoalkoxysilane was not observed, though conversions of the trialkoxysilanes were low.

What is claimed is:

1. A process for manufacturing silane comprising subjecting a trialkoxysilane in the gaseous state, said trialkoxysilane represented by the general formula (A)

wherein each of $R^1$, $R^2$ and $R^3$ is an alkyl group having 1 to 3 carbon atoms, to a disproportionation reaction in a phase consisting of the gaseous phase by supplying said trialkoxysilane to a reaction zone containing a catalyst which is an oxide of a metal in the third period of the periodic table.

2. A process for manufacturing silane according to claim 1 wherein said oxide of the metal in the third period of the periodic table is aluminum oxide.

3. A process for manufacturing silane according to claim 2 wherein said disproportionation reaction in the gaseous phase is carried out at a temperature of 100° to 500° C.

4. A process for manufacturing silane according to claim 2 wherein said disproportionation reaction in the gaseous phase is carried out at a temperature of 150° to 350° C.

5. A process for manufacturing silane according to claim 1 wherein said trialkoxysilane which is a raw material is at least one selected from the group consisting of trimethoxysilane, triethoxysilane, tripropoxysilane, triisopropoxysilane, ethoxydimethoxysilane, diethoxymethoxysilane, dimethoxypropoxysilane and diethoxyisopropoxysilane.

6. A process for manufacturing silane according to claim 2 wherein said trialkoxysilane which is a raw material is at least one selected from the group consisting of trimethoxysilane, triethoxysilane, tripropoxysilane, triisopropoxysilane, ethoxydimethoxysilane, diethoxymethoxysilane, dimethoxypropoxysilane and diethoxyisopropoxysilane.

7. A process for manufacturing silane according to claim 1 wherein said oxide of the metal in the third period of the periodic table is silicon dioxide.

8. A process for manufacturing silane according to claim 1 wherein said oxide of the metal in the third period of the periodic table is magnesium oxide.

9. A process for manufacturing silane comprising subjecting a trialkoxysilane represented by the general formula (A)

$$\begin{array}{c} OR^2 \\ | \\ R^1O-Si-H \\ | \\ OR^3 \end{array} \quad (A)$$

wherein each of $R^1$, $R^2$ and $R^3$ is an alkyl
group having 1 to 3 carbon atoms, to a disproportionate reaction in a phase consisting of the gaseous phase carried out at a temperature of 100° to 500° C. in the presence of a catalyst which is an oxide of a metal in the third period of the periodic table.

10. A process for manufacturing silane according to claim 9 wherein said oxide of the metal in the third period of the periodic table is aluminum oxide.

11. A process for manufacturing silane according to claim 9 wherein said disproportionation reaction in the gaseous phase is carried out at a temperature of 150° to 350° C.

12. A process for manufacturing silane according to claim 9 wherein said trialkoxysilane which is a raw material is at least one selected from the group consisting of trimethoxysilane, triethoxysilane, tripropoxysileane, triisopropoxysilane, ethoxydimethoxysilane, diethoxymethoxysilane, dimethoxypropoxysilane and diethoxyisopropoxysilane.

13. A process for manufacturing silane according to claim 9 wherein said oxide of the metal in the third period of the periodic table is magnesium oxide.

14. A process for manufacturing silane comprising subjecting a trialkoxysilane represented by the general formula (A)

$$\begin{array}{c} OR^2 \\ | \\ R^1O-Si-H \\ | \\ OR^3 \end{array} \quad (A)$$

wherein each of $R^1$, $R^2$ and $R^3$ is an alkyl
group having 1 to 3 carbon atoms, to a disproportionation reaction in a phase consisting of the gaseous phase in the presence of a catalyst which is silicon oxide.

15. A process for manufacturing silane according to claim 14 wherein said disproportionation reaction in the gaseous phase is carried out at a temperature of 100° to 500° C.

16. A process for manufacturing silane according to claim 14 wherein said disproportionation reaction in the gaseous phase is carried out at a temperature of 150° to 350° C.

17. A process for manufacturing silane according to claim 14 wherein said trialkoxysilane which is a raw material is at least one selected from the group consisting of trimethoxysilane, triethoxysilane, tripropoxysilane, triisopropoxysilane, ethoxydimethoxysilane, diethoxymethoxysilane, dimethoxypropoxysilane and diethoxyisopropoxysilane.

* * * * *